(12) United States Patent
Puma et al.

(10) Patent No.: US 12,418,902 B2
(45) Date of Patent: Sep. 16, 2025

(54) PRIVATE NETWORK MANAGEMENT INCLUDING LICENSED AND UNLICENSED RADIO UNIT CHANNEL AGGREGATION ORCHESTRATION

(71) Applicant: DISH Wireless L.L.C., Englewood, CO (US)

(72) Inventors: John Puma, Castle Rock, CO (US); Montgomery Groff, Denver, CO (US); Ross Drennan, Monument, CO (US); Paul Keator, Elizabeth, CO (US); Mark Templeman, Parker, CO (US); Marcel Guajardo, Lakewood, CO (US); Gerard Canavan, Englewood, CO (US); Adam Saenger, Castle Pines, CO (US); Monte Giles, Littleton, CO (US)

(73) Assignee: DISH WIRELESS L.L.C., Englewood, CO (US)

( * ) Notice: Subject to any disclaimer, the term of this patent is extended or adjusted under 35 U.S.C. 154(b) by 435 days.

(21) Appl. No.: 17/975,325

(22) Filed: Oct. 27, 2022

(65) Prior Publication Data
US 2024/0147439 A1    May 2, 2024

(51) Int. Cl.
*H04W 72/0453* (2023.01)
*H04W 16/14* (2009.01)
*H04W 84/12* (2009.01)

(52) U.S. Cl.
CPC ....... *H04W 72/0453* (2013.01); *H04W 16/14* (2013.01); *H04W 84/12* (2013.01)

(58) Field of Classification Search
None
See application file for complete search history.

(56) References Cited

U.S. PATENT DOCUMENTS

2022/0240098 A1\* 7/2022 Balasubramanian ....................... H04L 5/1469
2022/0400385 A1\* 12/2022 Eklund ................. H04W 16/14

OTHER PUBLICATIONS

"3rd Generation Partnership Project; Technical Specification Group Radio Access Network; NR; User Equipment (UE) radio transmission and reception; Part 1: Range 1 Standalone (Release 15)," 3GPP TS 38.101-1 V15.18.0, Technical Specification, Jun. 2022, 204 pages.

\* cited by examiner

*Primary Examiner* — Walter J Divito
(74) *Attorney, Agent, or Firm* — Seed Intellectual Property Law Group LLP (57) ABSTRACT

A method of operating a private network includes obtaining channel requirement information indicating a bandwidth of a channel, obtaining available channel information indicating Citizens Broadband Radio Service (CBRS) frequency bands and non-CBRS frequency bands available to be allocated to the channel, selecting one or more of the CBRS frequency bands and one or more of first non-CBRS frequency bands based on the channel requirement information, generating channel aggregation information indicating the selected CBRS and non-CBRS frequency bands, generating transmission power level information for the selected CBRS and non-CBRS frequency bands, transmitting the channel aggregation information and the transmission power level information, receiving the first channel aggregation information and the first transmission power level information at an access point device, and transmitting data in the channel using the selected CBRS and non-CBRS frequency bands from the access point device based on the first transmission power level information.

20 Claims, 8 Drawing Sheets

PRIVATE NETWORK MANAGEMENT INCLUDING LICENSED AND UNLICENSED RADIO UNIT CHANNEL AGGREGATION ORCHESTRATION

BACKGROUND

Conventionally, cellular access point devices communicate with client devices using cellular communications standards (e.g., 4G LTE or 5G communications standards from the 3rd Generation Partnership Project (3GPP)). Also, wireless local area network (WLAN) access point devices communicate with client devices using WLAN communications standards (e.g., Wi-Fi using one or more of the 802.11 family of communications standards from the Institute of Electrical and Electronics Engineers (IEEE)). Conventionally, cellular access point devices are provided separately from WLAN access point devices and, thus, channel allocation for cellular communications is done separately from channel allocation for WLAN communications. In addition, management of cellular access point devices is done separately from management of WLAN access point devices.

BRIEF SUMMARY

According to the present disclosure, private networks are formed from access point devices that communicate with client devices using both cellular communications standards and WLAN communications standards. Also, a single network management platform manages both channels in which data is communicated using cellular communications standards and channels in which data is communicated using WLAN communications standards. In addition, a channel allocation device aggregates both licensed frequency bands and unlicensed frequency bands for channels based on requirements (e.g., Quality of Service (QoS) requirements) of client device and applications.

A method of operating a private network according to a first aspect of the present disclosure includes: obtaining, by a channel allocation device, first channel requirement information indicating a first bandwidth of a channel; obtaining, by the channel allocation device, available channel information indicating a plurality of first Citizens Broadband Radio Service (CBRS) frequency bands and a plurality of first non-CBRS frequency bands available to be allocated to the channel; selecting, by the channel allocation device, one or more of the first CBRS frequency bands and one or more of the first non-CBRS frequency bands based on the first channel requirement information; generating, by the channel allocation device, first channel aggregation information indicating the one or more of the first CBRS frequency bands and the one or more of the first non-CBRS frequency bands selected based on the first channel requirement information; generating, by the channel allocation device, first transmission power level information indicating one or more first transmission power levels respectively corresponding to the one or more of the first CBRS frequency bands and one or more first transmission power levels respectively corresponding to the one or more of the first non-CBRS frequency bands; transmitting, by the channel allocation device, to an external device, the first channel aggregation information and the first transmission power level information; receiving, by a first access point device, the first channel aggregation information and the first transmission power level information; and transmitting, by the first access point device, first data in the channel using the one or more of the first CBRS frequency bands and the one or more of the first non-CBRS frequency bands based on the first transmission power level information.

A method of operating a private network according to a second aspect of the present disclosure includes: obtaining, by a control device, access point information indicating one or more access point devices including a first access point device; obtaining, by the control device, client device information indicating a plurality of client devices including a first client device and a second client device; generating, by the control device, channel information indicating a plurality of channels, including a first channel and a second channel; transmitting, by the first access point device, to the first client device, first data according to a cellular communication standard using the first channel; and transmitting, by the first access point device, to the second client device, second data according to a Wireless Local Area Network (WLAN) communication standard using the second channel.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the present disclosure, reference will be made to the following Detailed Description, which is to be read in association with the accompanying drawings.

DETAILED DESCRIPTION

According to the present disclosure, a novel private network small cell is provided by one or more access point devices that utilize a unique combination of cellular frequency bands and Wireless Local Area Network (WLAN) frequency bands (e.g., Wi-Fi frequency bands). For example, a combination or carrier aggregation of $4^{th}$ Generation (4G) Long Term Evolution (LTE) cellular bands and $5^{th}$ Generation (5G) New Radio (NR) cellular bands, such as mid-band spectrum bands, b48, n77, and n48 (i.e., Citizens Broadband Radio Service (CBRS) frequency bands), and unlicensed frequency bands (e.g., Wi-Fi frequency bands) enables greater bandwidth of licensed spectrum.

Because of the difference in FCC rules of operation for CBRS frequency bands (i.e., n48 frequency bands) versus non-CBRS frequency bands (e.g., n77 frequency bands) and unlicensed frequency bands (e.g., Wi-Fi frequency bands such as 2.4 GHz, 5 GHz, and 6 GHz frequency bands), channel aggregation orchestration is required in order to combine CBRS frequency bands, non-CBRS frequency bands, and unlicensed frequency bands. Although 3rd Generation Partnership Project (3GPP) standards exist (e.g., 3GPP TS 38.101-1 V15.18.0 (2022-06)) that establish the various carrier aggregation combinations of the n77 and n48 frequency bands, the present application teaches an orchestration mechanism that selects and deploys specific combinations in real-time for a given network payload or QoS requirement, which is not addressed by existing 3GPP standards. Moreover, there is no known solution that orchestrates channels formed by aggregating n48 frequency bands and n77 frequency bands.

While n77 frequency bands are mentioned as an example, orchestration of the use of frequency bands other than n77 frequency bands is within the scope of the present disclosure. For example, the orchestration mechanism disclosed herein could be used for other combinations of frequency bands such as n48 frequency bands and n71 frequency bands. Also, orchestration of G frequency bands (e.g., 110 GHz to 300 GHz) is within the scope of the present disclosure.

If WLAN frequency bands (e.g., Wi-Fi frequency bands) are used, a transmission using those frequency bands is subject to a much lower power output limit than transmissions in both n48 frequency bands and n77 frequency bands, for example. Access point devices according to the present disclosure employ a Radio Unit (RU) design that leverages any combination of spectrum that includes CBRS frequency bands (i.e., n48 frequency bands) with other bands, including unlicensed frequency bands (e.g., Wi-Fi frequency bands), an RU channel aggregation orchestration mechanism manages the operation of the RU to adhere to Federal Communication Commission (FCC) operating rules while still meeting network performance requirements.

By way of non-limiting example, channel aggregation orchestration is performed using a combination of unlicensed frequency spectrum and licensed frequency spectrum. Such unlicensed frequency spectrum includes WLAN frequency spectrum (e.g., Wi-Fi frequency bands, including 2.4 GHz, 5 GHz, and 6 GHz frequency bands), and the CBRS General Authorized Access (GAA) frequency spectrum (e.g., frequency bands in the 3.55-3.70 GHz range). Such licensed frequency spectrum includes CBRS frequency bands (e.g., n48 frequency bands in the 3.55-3.65 GHz range), Priority Access License (PAL) frequency bands, non-CBRS frequency bands (e.g., n77 frequency bands in the range of 3.45-3.55 GHz), etc.

According to the present disclosure, WLAN protocols (e.g., Wi-Fi protocols) and cellular protocols (e.g., 5G/4G LTE protocols) are used by access point devices for communication with end user or client devices (e.g., User Equipment (UE) devices such as phones, tablets, adapters connected to industrial machinery, Augmented Reality (AR)/Virtual Reality (VR) headsets, etc.). Access point devices according to the present disclosure can utilize cellular protocols (e.g., 5G/4G LTE protocols) and WLAN protocols (e.g., Wi-Fi protocols) for fronthaul communications with end user or client devices. In addition, small cell private networks according to the present disclosure can utilize either WLAN protocols (e.g., Wi-Fi small cell private networks) or cellular small cell private networks protocols (e.g., 5G/4G LTE small cell private networks) for wireless communication between access point devices that are linked together to form a small cell. The present disclosure teaches a single platform capable of integrated network management that enables such private networks to be created and managed. Accordingly, a single platform is provided that can manage all devices, configurations, and policies within a private network, unlike conventional solutions that require separate platforms and, thus, separate management of configurations and policies for cellular devices and WLAN devices.

Figure 1:
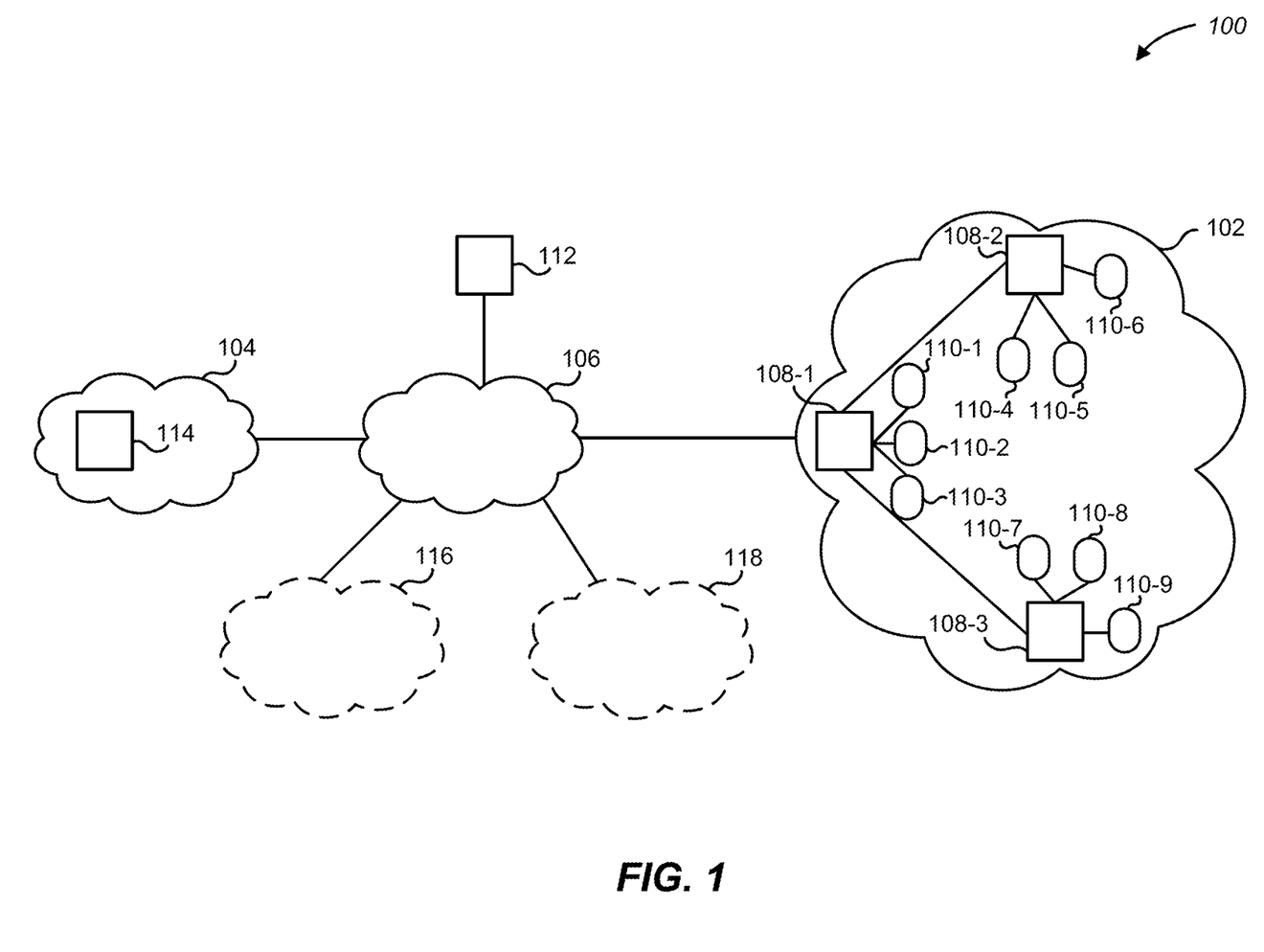
FIG. 1 is a diagram of a communication system in accordance with embodiments described herein.

FIG. 1 is a diagram of a communication system 100 in accordance with embodiments described herein. The communication system 100 includes a private network 102 that communicates with a private network core 104 via a network 106. In one or more implementations, the network 106 is provided by a commercial Internet Service Provider (ISP).

The private network 102 is provided by access point devices 108-1, 108-2, and 108-3. Although the private network 102 shown in FIG. 1 includes three access point devices, private networks that include a different number of access point devices are within the scope of the present application.

Each of the access point devices 108-1, 108-2, and 108-3 communicates with at least one other of the access point devices 108-1, 108-2, and 108-3. Also, each of the access point devices 108-1, 108-2, and 108-3 communicates with one or more client devices. The client devices may include a combination of different types of devices, such as cell phones or User Equipment (UE) devices, Augmented Reality (AR)/Virtual Reality (VR) headsets, security cameras, tablet computers, laptop computers, and wireless network adapters for industrial machinery, for example.

In the example shown in FIG. 1, the access point device 108-1 communicates with the access point devices 108-2 and 108-3. Also, the access point device 108-1 communicates with client devices 110-1, 110-2, and 110-3. The access point device 108-2 communicates with client devices 110-4, 110-5, and 110-6. The access point device 108-3 communicates with client devices 110-7, 110-8, and 110-9.

In one or more implementations, the access point device 108-1 is a root node that configures the access point devices 108-2 and 108-3. For example, a control device 112 provides configuration information to the access point device 108-1, which uses the configuration information to configure itself and the access point devices 108-2 and 108-3. The configuration information includes frequency spectrum information indicating a plurality of frequency bands to be used to for different types of communications.

In one or more implementations, the access point devices 108-1, 108-2 and 108-3 are peers and are configured independently. For example, the control device 112 provides the configuration information to the access point devices 108-1, 108-2, and 108-3, which use the configuration information to configure themselves.

The control device 112 enables management of cellular services (e.g., 4G LTE and 5G NR services) and WLAN services (e.g., Wi-Fi services) in the private network 102 formed by the access point devices 108-1, 108-2, and 108-3, which provide a 4G or 5G small cell. More particularly, the control device 112 enables management of devices, network configuration, Quality of Service (QoS) designations, and subscription services. For example, the control device 112 enables configuration of private cellular network parameters, including Public Land Mobile Network (PLMN) identifiers, configuration of access point devices to form a private cellular small cell, registration and provisioning of end user or client devices (e.g., User Equipment (UE) devices), management of Subscriber Identity Modules (SIMs) and International Mobile Subscriber Identity numbers (IMSI), communication with a spectrum management system for private 4G and 5G networks, QoS designations for devices and applications, QoS measurement and reporting configuration, policy management and control, transport Protocol designations (e.g., WLAN only (e.g., Wi-Fi only), cellular only (e.g., 4G or 5G only), both WLAN and cellular) for devices and applications, management of subscription services, network connection and authorization management, management of phone numbers, an Application Programming Interface (API) to a public cellular network (e.g., operated by DISH Network), and associated user interface for a user/operator portal for the above features.

In one or more implementations, the control device 112 enables an operator of the private network 102 to manage user profile settings and accounts of authorized users, and manage related subscriptions. Also, the control device 112 provides a dashboard of network health and Key Performance Indicators (KPIs) (e.g., peak data rate, peak spectral efficiency, data rate experienced by user, area traffic capacity, latency (User Plane), connection density, average spectral efficiency, energy efficiency, reliability, mobility, mobility interruption time, and bandwidth, which have been established and associated with specific minimum KPI values for different categories of services). Additionally, the control device 112 enables access point device and client device registration and policy settings, management/selection of licensed spectrum, management of transport protocol settings, management of phone numbers, management of QoS settings for devices and applications, and access point device configuration. In addition, the control device 112 interfaces with a 5G User Plane Function (UPF) of the 5G private network core 104 and also interfaces with a 5G Policy Control Function (PCF) of the 5G private network core 104. Additionally or alternatively, the control device 112 can interface with a 4G UPF and 4G PCF.

The communication system 100 also includes a channel allocation device 114 that operates in the private network core 104. In one or more implementations, the communication system 100 includes an enterprise Local Area Network (LAN) 116. In one or more implementations, the communication system 100 includes a network 118, which includes one or more devices that provide voice and messaging services.

The channel allocation device 114 performs Radio Unit (RU) channel aggregation orchestration. For example, the channel allocation device 114 manages channel aggregation using n48 and n77 frequency bands, by selecting and deploying a channel formed by aggregating n48(2A) and n77A frequency bands, or a channel formed by aggregating n48B and n77A frequency bands, across multiple access point devices. Also, the channel allocation device 114 performs real-time analysis of RU spectrum band use, performs real-time analysis of RU channel aggregation channel use (e.g., in n48 and n77 frequency bands), and performs real-time analysis of network payload, use case requirements, and/or QoS requirements. Additionally, the channel allocation device 114 interfaces with a spectrum management system for the private network 102, and interfaces with a CBRS Spectrum Access Server (SAS) (not shown) that grants authorization to n48 licensed spectrum (PALs) to RUs. In addition, the channel allocation device 114 performs or interfaces with devices that perform RU output power orchestration.

Figure 2:
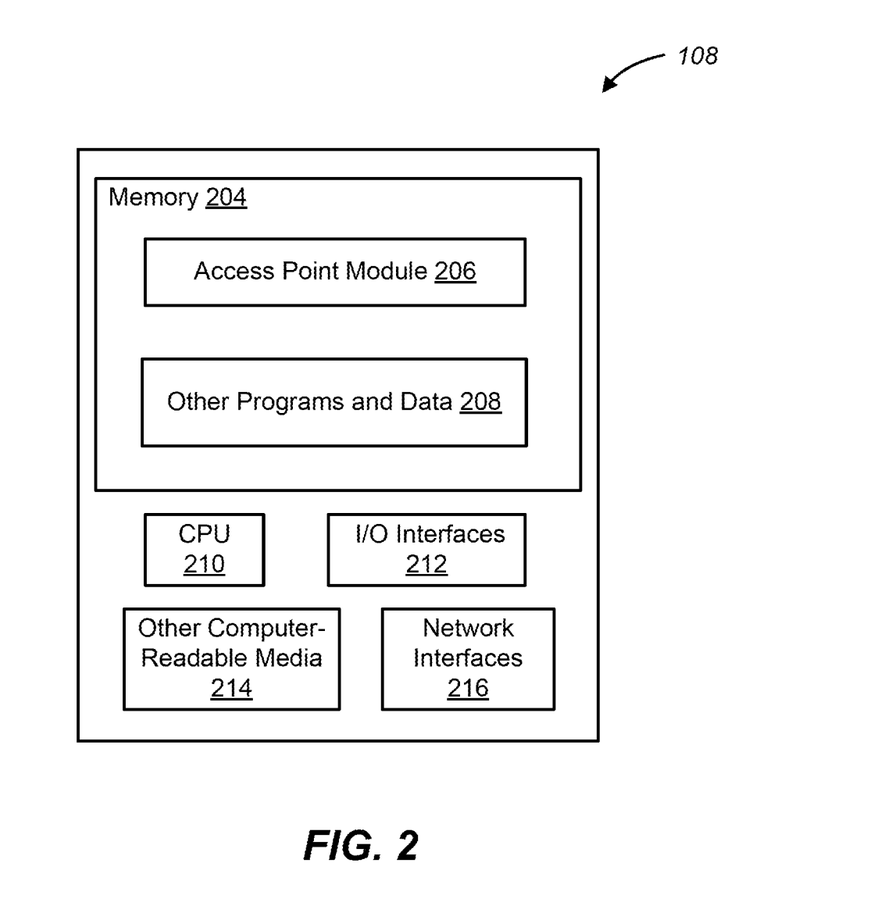
FIG. 2 is a block diagram illustrating an example of an access point device in accordance with embodiments described herein.

FIG. 2 is a block diagram illustrating an example of an access point device 108 in accordance with embodiments described herein. The access point devices 108-1, 108-2, and 108-3 shown in FIG. 1 have the same configuration as the access point device 108. In some embodiments, one or more special-purpose computing systems may be used to implement the access point device 108. Accordingly, various embodiments described herein may be implemented in software, hardware, firmware, or in some combination thereof. The access point device 108 may include one or more memory devices 204, one or more central processing units (CPUs) 210, I/O interfaces 212, other computer-readable media 214, and network interfaces 216.

The one or more memory devices 204 may include one or more various types of non-volatile and/or volatile storage technologies. Examples of the one or more memory devices 204 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. The one or more memory devices 204 may be utilized to store information, including computer-readable instructions that are utilized by the one or more CPUs 210 to perform actions, including those of embodiments described herein.

The one or more memory devices 204 may have stored thereon an access point module 206. The access point module 206 is configured to implement and/or perform some or all of the functions of the access point device 108 described herein. The one or more memory devices 204 may also store other programs and data 208, which may include digital certificates, connection recovery algorithms, connection recovery rules, network protocols, O-RAN operating rules, user interfaces, operating systems, etc.

I/O interfaces 212 may include enhanced Common Public Radio Interface (eCPRI) ports, Antenna Interface Standards Group (AISG) interfaces, other data input or output interfaces, or the like. Other computer-readable media 214 may include other types of stationary or removable computer-readable media, such as removable flash drives, external hard drives, or the like. Network interfaces 216 are configured to communicate with other computing devices including client devices and other access point devices. In various embodiments, the network interfaces 216 include transmitters and receivers, a layer 2 (L2) switch and physical network ports (not illustrated) to send and receive data as described herein, and to send and receive instructions, commands and data to implement the processes described herein. For example, some of the transmitters and receivers of the network interfaces 216 are configured to transmit and receive information according to IEEE 802.11 communication standards (e.g., 802.11, 802.11a, 802.11, 802.11g, 802.11n, 802.11ac, 802.11ax, 802.11be, etc.), and some of the transmitters and receivers of the network interfaces 216 are configured to transmit and receive information according to cellular communication standards (e.g., 4G LTE, 5G, etc.).

Figure 3:
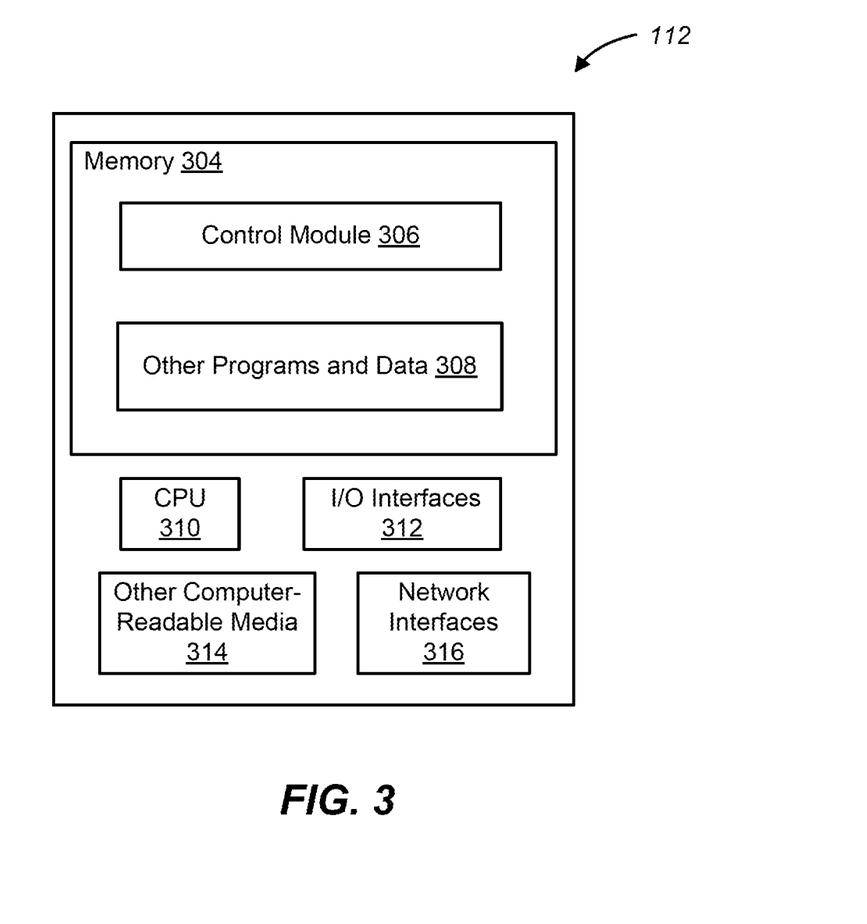
FIG. 3 is a block diagram illustrating an example of a private network control device in accordance with embodiments described herein.

FIG. 3 is a block diagram illustrating an example of a control device 112 in accordance with embodiments described herein. In some embodiments, one or more special-purpose computing systems may be used to implement the control device 112. Accordingly, various embodiments described herein may be implemented in software, hardware, firmware, or in some combination thereof. The control device 112 may include one or more memory devices 304, one or more central processing units (CPUs) 310, I/O interfaces 312, other computer-readable media 314, and network interfaces 316.

The one or more memory devices 304 may include one or more various types of non-volatile and/or volatile storage technologies. Examples of the one or more memory devices 304 may include, but are not limited to, flash memory, hard disk drives, optical drives, solid-state drives, various types RAM, various types of ROM, other computer-readable storage media (also referred to as processor-readable storage media), or the like, or any combination thereof. The one or more memory devices 304 may be utilized to store information, including computer-readable instructions that are utilized by the one or more CPUs 310 to perform actions, including those of embodiments described herein.

The one or more memory devices 304 may have stored thereon a control module 306. The control module 306 is configured to implement and/or perform some or all of the functions of the control device 112 described herein. The one or more memory devices 304 may also store other programs and data 308, which may include programs for communicating with the channel allocation device 114 and the access point devices 108-1, 108-2, and 108-3, digital certificates, network protocols, user interfaces, operating systems, etc.

I/O interfaces 312 may include enhanced data input or output interfaces, or the like. Other computer-readable media 314 may include other types of stationary or removable computer-readable media, such as removable flash drives, external hard drives, or the like. Network interfaces 316 are configured to communicate with other computing devices including the channel allocation device 114 and the access point devices 108-1, 108-2, and 108-3. In various embodiments, the network interfaces 316 include transmitters and receivers, physical network ports (not illustrated) to send and receive data as described herein, and to send and receive instructions, commands and data to implement the processes described herein.

Figure 4:
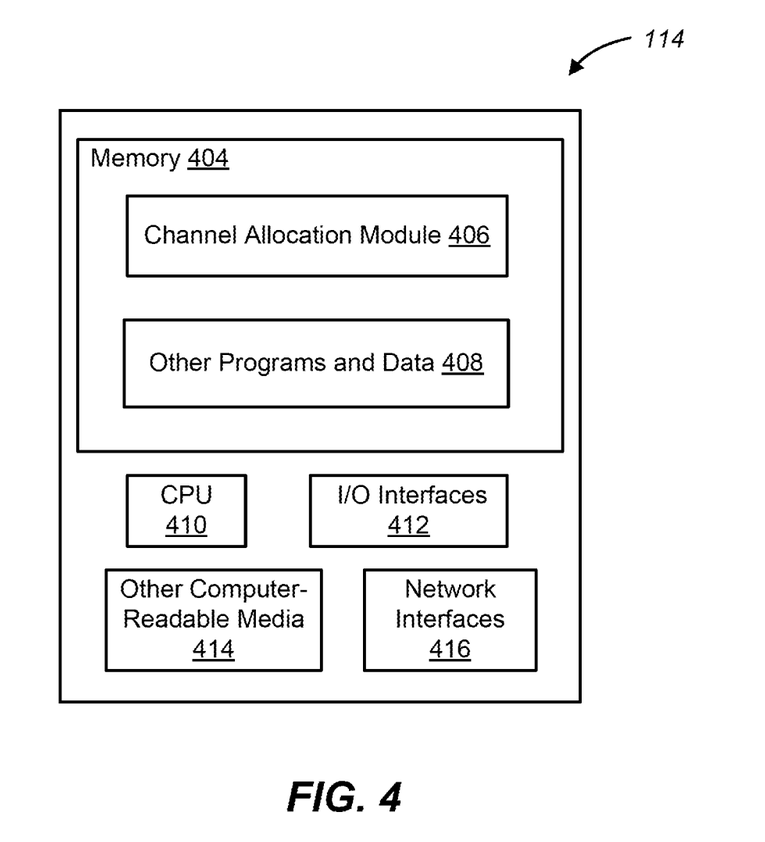
FIG. 4 is a block diagram illustrating an example of a channel allocation device in accordance with embodiments described herein.

FIG. 4 is a block diagram illustrating an example of a channel allocation device 114 in accordance with embodiments described herein. In some embodiments, one or more special-purpose computing systems may be used to implement the channel allocation device 114. Accordingly, various embodiments described herein may be implemented in software, hardware, firmware, or in some combination thereof. The channel allocation device 114 may include one or more memory devices 404, one or more central processing units (CPUs) 410, I/O interfaces 412, other computer-readable media 414, and network interfaces 416.

The one or more memory devices 404 may include one or more various types of non-volatile and/or volatile storage technologies. Examples of the one or more memory devices 404 may include, but are not limited to, flash memory, hard disk drives, optical drives, solid-state drives, various types RAM, various types of ROM, other computer-readable storage media (also referred to as processor-readable storage media), or the like, or any combination thereof. The one or more memory devices 404 may be utilized to store information, including computer-readable instructions that are utilized by the one or more CPUs 410 to perform actions, including those of embodiments described herein.

The one or more memory devices 404 may have stored thereon a channel allocation module 406. The channel allocation module 406 is configured to implement and/or perform some or all of the functions of the channel allocation device 114 described herein. The one or more memory devices 404 may also store other programs and data 408, which may include digital certificates, network protocols, user interfaces, operating systems, etc., programs for communicating with the control device 112, the access point devices 108-1, 108-2, and 108-3, and a spectrum management system, which communicates with a Spectrum Access System (SAS) service provider device and a device that maintains databases of frequency bands for licenses that have already been acquired by an operator of the core network 104.

I/O interfaces 412 may include enhanced data input or output interfaces, or the like. Other computer-readable media 414 may include other types of stationary or removable computer-readable media, such as removable flash drives, external hard drives, or the like. Network interfaces 416 are configured to communicate with other computing devices including the control device 112, the access point devices 108-1, 108-2, and 108-3, Spectrum Access System (SAS) service provider devices, and devices that maintain databases of frequency bands for licenses that have already been acquired. In various embodiments, the network interfaces 416 include transmitters and receivers, physical network ports (not illustrated) to send and receive data as described herein, and to send and receive instructions, commands and data to implement the processes described herein.

Figure 5A:
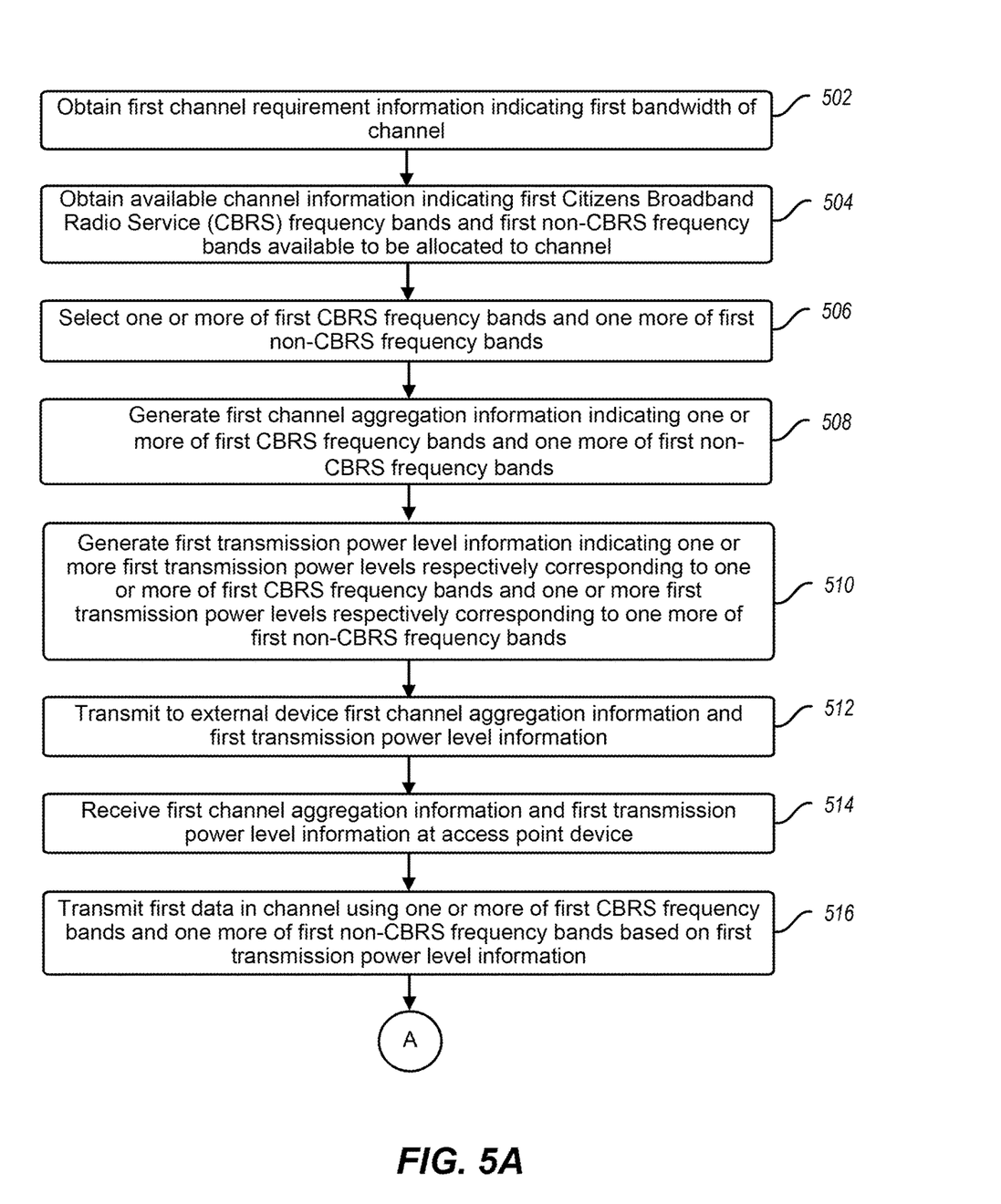
FIGS. 5A and 5B illustrate a logical flow diagram showing an example of a method of operating a private network in accordance with embodiments described herein.
Figure 5B:
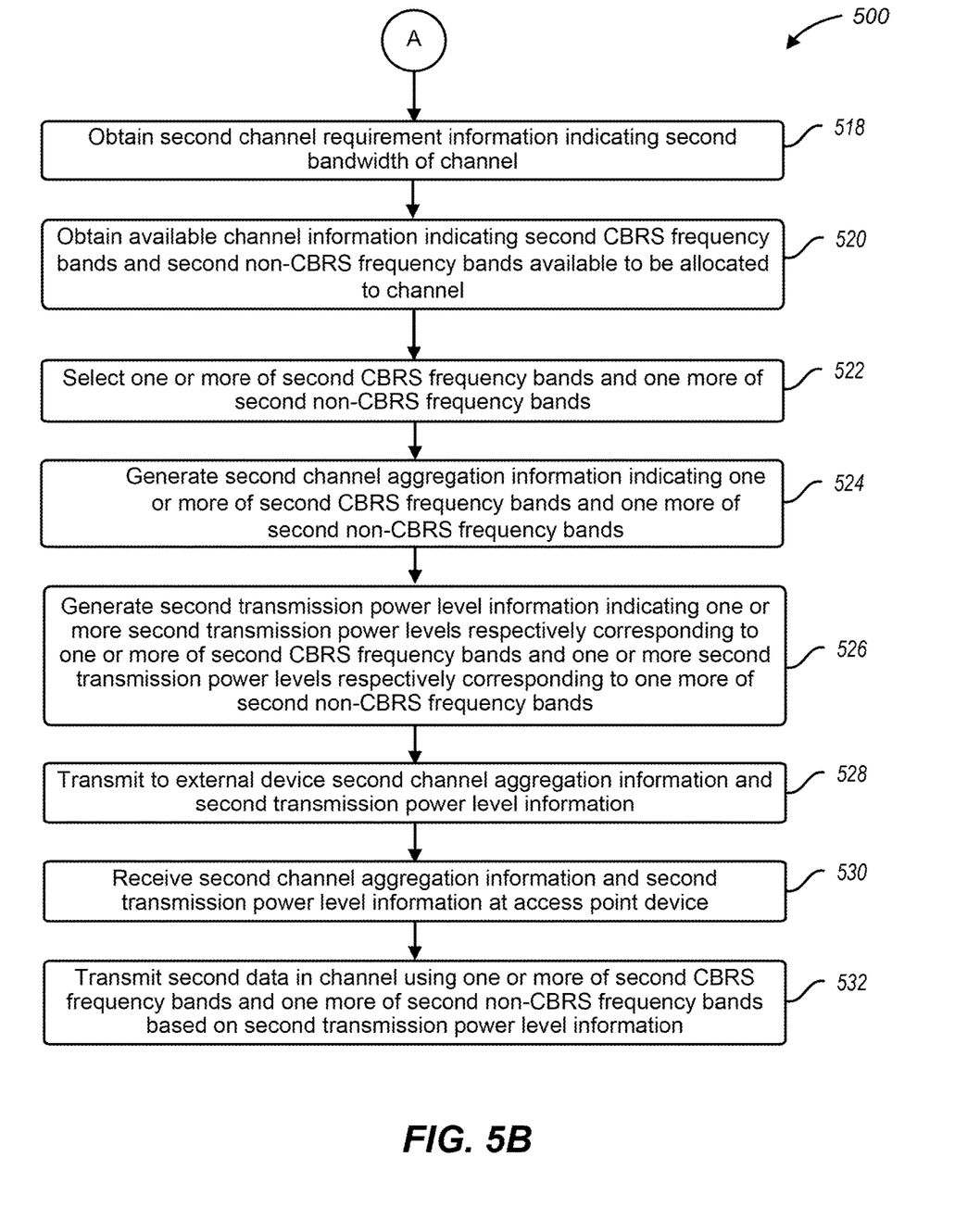

FIGS. 5A and 5B illustrate a logical flow diagram showing an example of a method 500 of operating a communication system in accordance with embodiments described herein. The method 500 begins at 502 in FIG. 5A.

At 502, first channel requirement information indicating a first bandwidth of a channel is obtained. For example, at 502, the channel allocation device 114 obtains the first channel requirement information indicating the first bandwidth of the channel from the control device 112, which determines the first bandwidth of the channel based on configuration settings made by an operator of the private network 102 via operation of the control device 112. The method 500 then proceeds to 504.

At 504, available channel information indicating a plurality of first Citizens Broadband Radio Service (CBRS) frequency bands and a plurality of first non-CBRS frequency bands available to be allocated to the channel is obtained. For example, at 504, the channel allocation device 114 obtains the available channel information indicating the plurality of first CBRS frequency bands and the plurality of first non-CBRS frequency bands available to be allocated to the channel from a spectrum management device, which communicates with a spectrum management system for the private network 102 and a CBRS Spectrum Access Server (SAS). The method 500 then proceeds to 506.

At 506, one or more of the first CBRS frequency bands is selected and one or more of the first non-CBRS frequency bands is selected. For example, at 506, if the first bandwidth of the channel is 35 megahertz (MHz), the channel allocation device 114 selects a frequency band having a bandwidth of 20 MHz in the n48 frequency band and selects a frequency band having a bandwidth of 15 MHz in the n77 frequency band, so that the sum of the bandwidth of the selected frequency bands is the first bandwidth (e.g., 35 MHz) indicated by the first channel requirement information obtained at 502. The method 500 then proceeds to 508.

At 508, first channel aggregation information indicating the one or more of first CBRS frequency bands selected at 506 and the one or more of first non-CBRS frequency bands selected at 506 is generated. For example, at 508, the channel allocation device 114 generates a message including an identifier of each of the selected frequency bands (e.g., in the n48(2A) and n77A frequency bands). The method 500 then proceeds to 510.

At 510, first transmission power level information indicating one or more first transmission power levels respectively corresponding to the one or more of the first CBRS frequency bands and one or more first transmission power levels respectively corresponding to the one or more of the first non-CBRS frequency bands is generated. For example, at 510, the channel allocation device 114 stores a table or other suitable data structure including identifiers of each of the frequency bands that is available for allocation to the channel in association with corresponding power level values that have been determined (e.g., calculated) previously. The method 500 then proceeds to 512.

At 512, the first channel aggregation information generated at 508 and the first transmission power level information generated at 510 are transmitted to an external device. The method 500 then proceeds to 514. For example, at 510, the channel allocation device 114 transmits a message including the first channel aggregation information generated at 508 and the first transmission power level information generated at 510 to the control device 112. By way of another example, at 510, the channel allocation device 114 transmits a message including the first channel aggregation information generated at 508 and the first transmission power level information generated at 510 to the access point devices 108-1, 108-2, and 108-3. The method 500 then proceeds to 514.

At 514, the first channel aggregation information and the first transmission power level information transmitted at 512 is received by at least one access point device. For example, at 514, the access point devices 108-1, 108-2, and 108-3 receive the first channel aggregation information and the first transmission power level information transmitted at 512. The method 500 then proceeds to 516.

At 516, first data is transmitted in the channel using the one or more of the first CBRS frequency bands selected at 506 and the one or more of the first non-CBRS frequency bands selected at 506 based on the first transmission power level information generated at 510. For example, at 516, the access point device 108-1 transmits the first data to the client device 110-1 in the channel using the one or more of the first CBRS frequency bands and the one or more of the first non-CBRS frequency bands based on the first transmission power level information received at 514. The method 500 then proceeds to 518 in FIG. 5B.

At 518, second channel requirement information indicating a second bandwidth of a channel is obtained. For example, at 518, the channel allocation device 114 obtains the second channel requirement information indicating the second bandwidth of the channel from the control device 112, which determines the second bandwidth of the channel based on one or more parameters (e.g., throughput, bandwidth, or delay, etc.) calculated based on performance data obtained from within the private network 102, and a table or other data structures in which a plurality of identifiers of the one or more parameters is stored in association with a plurality of corresponding bandwidth values, which have been determined based on computer simulation. By way of another example, at 518, the channel allocation device 114 obtains the second channel requirement information indicating the second bandwidth of the channel from the control device 112, which determines the bandwidth of the channel based on configuration settings made by an operator of the private network 102, for example, that is upgrading one or more service subscriptions so that the private network 102 can provide network access to a greater number of client devices. The method 500 then proceeds to 520.

At 520, available channel information indicating a plurality of second CBRS frequency bands and a plurality of second non-CBRS frequency bands available to be allocated to the channel is obtained. For example, at 520, the channel allocation device 114 obtains the available channel information indicating the plurality of second CBRS frequency bands and the plurality of second non-CBRS frequency bands available to be allocated to the channel from a spectrum management device, which communicates with a spectrum management system for the private network 102 and a CBRS Spectrum Access Server (SAS). The method 500 then proceeds to 522.

At 522, one or more of the second CBRS frequency bands is selected and one or more of the second non-CBRS frequency bands is selected. For example, at 522, if the second bandwidth of the channel is 45 megahertz (MHz), the channel allocation device 114 selects a frequency band having a bandwidth of 20 MHz in the n48 frequency band and selects a frequency band having a bandwidth of 25 MHz in the n77 frequency band, so that the sum of the bandwidth of the selected frequency bands is the second bandwidth (e.g., 45 MHz) indicated by the second channel requirement information obtained at 518. The method 500 then proceeds to 524.

At 524, second channel aggregation information indicating the one or more of second CBRS frequency bands selected at 522 and the one or more of second non-CBRS frequency bands selected at 522 is generated. For example, at 524, the channel allocation device 114 generates a message including an identifier of each of the selected frequency bands (e.g., n48(2A) and n77A). The method 500 then proceeds to 526.

At 526, second transmission power level information indicating one or more second transmission power levels respectively corresponding to the one or more of the second CBRS frequency bands and one or more second transmission power levels respectively corresponding to the one or more of the second non-CBRS frequency bands is generated. For example, at 526, the channel allocation device 114 stores a table or other suitable data structure including identifiers of each of the frequency bands that is available for allocation to the channel in association with corresponding power level values that have been determined (e.g., calculated) previously. The method 500 then proceeds to 528.

At 528, the second channel aggregation information generated at 524 and the second transmission power level information generated at 526 are transmitted to an external device. For example, at 528, the channel allocation device 114 transmits a message including the second channel aggregation information generated at 524 and the second transmission power level information generated at 526 to the control device 112. By way of another example, at 528, the channel allocation device 114 transmits a message including the second channel aggregation information generated at 524 and the second transmission power level information generated at 526 to the access point devices 108-1, 108-2, and 108-3. The method 500 then proceeds to 530.

At 530, the second channel aggregation information and the second transmission power level information transmitted at 528 is received by at least one access point device. For example, at 532, the access point devices 108-1, 108-2, and 108-3 receive the second channel aggregation information and the second transmission power level information transmitted at 528. The method 500 then proceeds to 532.

At 532, second data is transmitted in the channel using the one or more of the second CBRS frequency bands selected at 522 and the one or more of the second non-CBRS frequency bands selected at 522 based on the second transmission power level information generated at 526. For example, at 532, the access point device 108-1 transmits the second data to the client device 110-1 in the channel using the one or more of the second CBRS frequency bands and the one or more of the second non-CBRS frequency bands based on the second transmission power level information received at 530. The method 500 then ends.

Figure 6A:
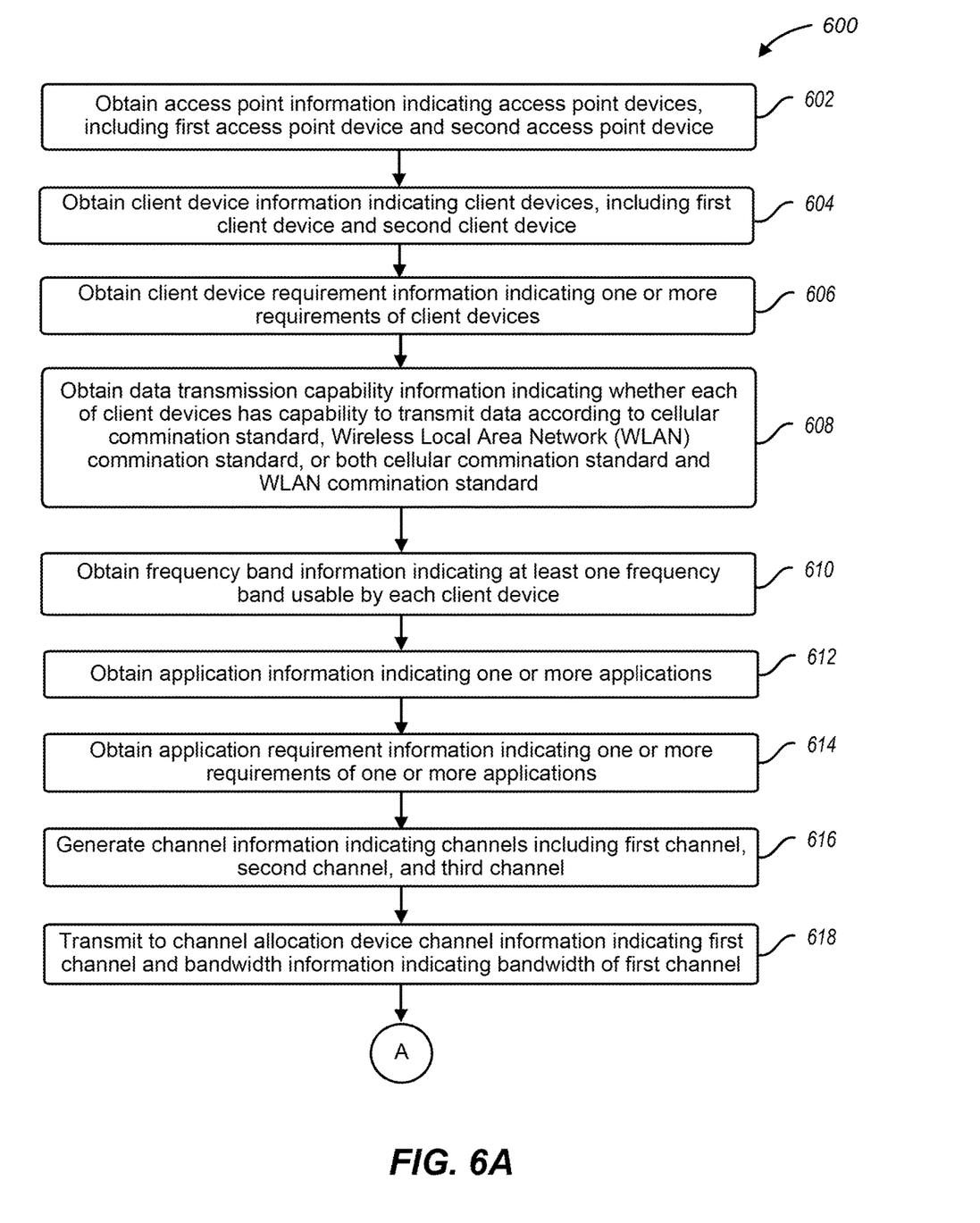
FIGS. 6A and 6B illustrate a logical flow diagram showing an example of a method of operating a private network in accordance with embodiments described herein.
Figure 6B:
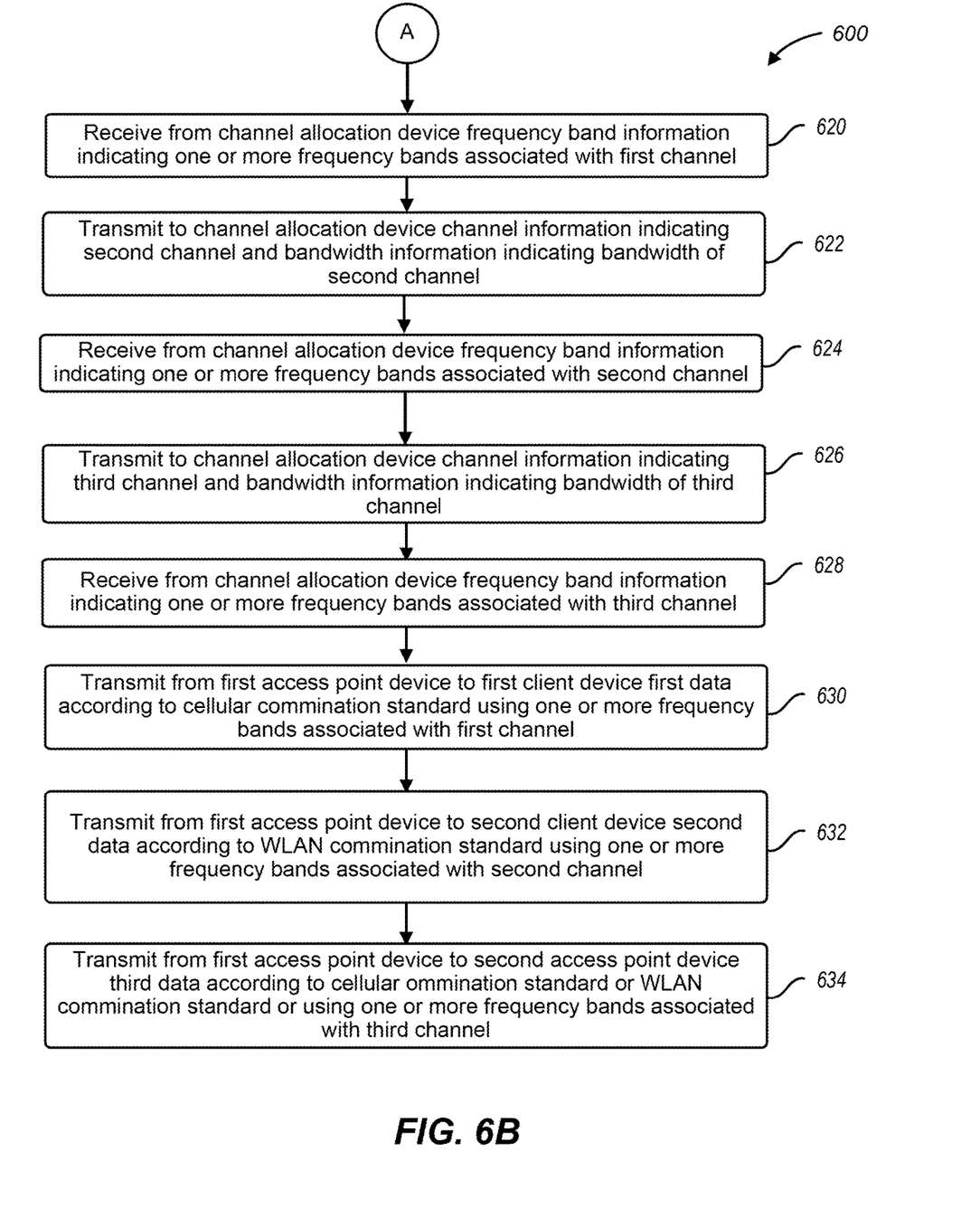

FIGS. 6A and 6B illustrate a logical flow diagram showing an example of a method 600 of operating a communication system in accordance with embodiments described herein. The method 600 begins at 602 in FIG. 6A.

At 602, access point information indicating a plurality of access point devices is obtained, wherein the access point information indicates at least a first access point device and a second access point device. For example, at 602, the control device 112 obtains the access point information in response to an operator of the control device 112 entering that information via a user interface provided by the control device 112. The method 600 then proceeds to 604.

At 604, client device information indicating a plurality of client devices is obtained, wherein the access point information indicates at least a first client device and a second client device. For example, at 604, the control device 112 obtains the client device information in response to an operator of the control device 112 entering that information via a user interface provided by the control device 112. The method 600 then proceeds to 606.

At 606, client device requirement information indicating one or more requirements of the client devices is obtained. For example, at 606, the control device 112 obtains the client device requirement indicating a minimum throughput or bandwidth value or a maximum latency value in response to an operator of the control device 112 entering those values via a user interface provided by the control device 112. By way of another example, at 606, the control device 112 generates the client device requirement indicating the minimum throughput or bandwidth value or the maximum latency value using a table or other suitable data structure storing a plurality values of requirements in association with a plurality of corresponding throughout, bandwidth, and/or latency values, or using a computer model and/or simulation, based on information entered via a user interface provided by the control device 112. The method 600 then proceeds to 608.

At 608, data transmission capability information indicating whether each of the client devices has a capability to transmit data according to a cellular communication standard (e.g., 4G, 5G), a Wireless Local Area Network (WLAN) communication standard (e.g., Wi-Fi-4, Wi-Fi-5, Wi-Fi-6, Wi-Fi-6E), or both a cellular communication standard and a WLAN communication standard is obtained. For example, at 608, the control device 112 obtains the data transmission capability in response to an operator of the control device 112 entering that information via a user interface provided by the control device 112. The method 600 then proceeds to 610.

At 610, frequency band information indicating at least one frequency band usable by each of the client devices is obtained. For example, at 610, the control device 112 stores a table or other suitable data structure including identifiers of each of a plurality of data transmission capability identifiers stored in association with corresponding identifiers of frequency bands, and obtains the frequency band information therefrom using the data transmission capability information obtained at 608. By way of another example, at 610, the client device obtains the frequency band information in response to an operator of the control device 112 entering those values via a user interface provided by the control device 112. In one or more implementations, the control device 112 selects the at least one frequency band usable by a client device based on a PLMN identifier stored in a SIM profile for the client device, and a table or other suitable data structure in which a plurality of PLMN identifiers is stored in association with a plurality of corresponding identifiers of frequency bands that may be allocated and/or not allocated. The method 600 then proceeds to 612.

At 612, application information indicating one or more applications is obtained. For example, at 612, the control device 112 obtains the application information (e.g., indicating a voice call application, a streaming video application, a security camera application, a VR/AR application, etc.) in response to an operator of the control device 112 entering that information via a user interface provided by the control device 112. The method 600 then proceeds to 614.

At 614, application requirement information indicating at least one requirement of the one or more applications is obtained. For example, at 614, the control device 112 stores a table or other suitable data structure including identifiers of each of a plurality of application identifiers stored in association with corresponding requirement values, and obtains the application requirement information therefrom using the data application information obtained at 612. By way of another example, at 614, the control device 112 obtains the application requirement information in response to an operator of the control device 112 entering those values via a user interface provided by the control device 112. The method 600 then proceeds to 616.

At 616, channel information indicating a plurality of channels is obtained, wherein the channel information indicates at least a first channel, a second channel, and a third channel, along with corresponding bandwidth values for each channel. For example, at 616, the control device 112 obtains the channel information in response to an operator of the control device 112 entering those values via a user interface provided by the control device 112. By way of another example, at 616, the control device 112 generates the channel information using a table or other suitable data structure storing channel identifiers in association with corresponding bandwidth values or using a computer model and/or simulation, based on information entered via a user interface provided by the control device 112. The method 600 then proceeds to 618.

At 618, the channel information for the first channel indicated by the channel information generated at 616 is transmitted to a channel allocation device. For example, at 618, the control device 112 transmits the channel information for the first channel indicated by the channel information generated at 616 to the channel allocation device 114. The method 600 then proceeds to 620 in FIG. 6B.

At 620, frequency band information indicating one or more frequency bands associated with the first channel is received from the channel allocation device. For example, at 620, the control device 112 receives the frequency band information indicating one or more frequency bands associated with the first channel from the channel allocation device 114. The method 600 then proceeds to 622.

At 622, the channel information for the second channel indicated by the channel information generated at 616 is transmitted to the channel allocation device. For example, at 622, the control device 112 transmits the channel information for the second channel indicated by the channel information generated at 616 to the channel allocation device 114. The method 600 then proceeds to 624.

At 624, frequency band information indicating one or more frequency bands associated with the second channel is received from the channel allocation device. For example, at 624, the control device 112 receives the frequency band information indicating one or more frequency bands associated with the second channel from the channel allocation device 114. The method 600 then proceeds to 622.

At 626, the channel information for the third channel indicated by the channel information generated at 616 is transmitted to the channel allocation device. For example, at 626, the control device 112 transmits the channel information for the third channel indicated by the channel information generated at 616 to the channel allocation device 114. The method 600 then proceeds to 628.

At 628, frequency band information indicating one or more frequency bands associated with the third channel is received from the channel allocation device. For example, at 628, the control device 112 receives the frequency band information indicating one or more frequency bands associated with the third channel from the channel allocation device 114. The method 600 then proceeds to 630.

At 630, first data is transmitted from a first access point device to a first client device according to a cellular communication standard using the one or more frequency bands associated with the first channel. For example, at 630, the access point device 108-1 transmits the first data to the client device 110-1 according to a 3GPP 4G or 5G cellular communication standard using the one or more frequency bands associated with the first channel. The method 600 then proceeds to 632.

At 632, second data is transmitted from the first access point device to a second client device according to a WLAN communication standard using the one or more frequency bands associated with the second channel. For example, at 632, the access point device 108-1 transmits the second data to the client device 110-2 according to a Wi-Fi-6 communication standard using the one or more frequency bands associated with the second channel. The method 600 then proceeds to 634.

At 634, third data is transmitted from the first access point device to a second access point device according to a cellular communication standard or a WLAN communication standard using the one or more frequency bands associated with the third channel. For example, at 634, the access point device 108-1 transmits the third data to the access point device 108-2 according to a 3GPP 4G or 5G cellular standard using the one or more frequency bands associated with the third channel. The method 600 then ends.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operating a private network, the method including:
obtaining, by a channel allocation device, first channel requirement information indicating a first bandwidth of a channel;
obtaining, by the channel allocation device, available channel information indicating a plurality of first Citizens Broadband Radio Service (CBRS) frequency bands and a plurality of first non-CBRS frequency bands available to be allocated to the channel;
selecting, by the channel allocation device, one or more of the first CBRS frequency bands and one or more of the first non-CBRS frequency bands based on the first channel requirement information;
generating, by the channel allocation device, first channel aggregation information indicating the one or more of the first CBRS frequency bands and the one or more of the first non-CBRS frequency bands selected based on the first channel requirement information;
generating, by the channel allocation device, first transmission power level information indicating one or more first transmission power levels respectively corresponding to the one or more of the first CBRS frequency bands and one or more first transmission power levels respectively corresponding to the one or more of the first non-CBRS frequency bands;
transmitting, by the channel allocation device, to an external device, the first channel aggregation information and the first transmission power level information;
receiving, by a first access point device, the first channel aggregation information and the first transmission power level information; and
transmitting, by the first access point device, first data in the channel using the one or more of the first CBRS frequency bands and the one or more of the first non-CBRS frequency bands based on the first transmission power level information.

2. The method according to claim 1, wherein the one or more of the first CBRS frequency bands include one or more frequency bands in a range from 3550 to 3700 megahertz, and the one or more of the first non-CBRS frequency bands include one or more frequency bands in a range from 3300 to 4200 megahertz.

3. The method according to claim 1, wherein the one or more of the first CBRS frequency bands include one or more frequency bands in a range from 3550 to 3700 megahertz, and the one or more of the first non-CBRS frequency bands include one or more frequency bands in a range from 2401 to 2495 megahertz, one or more frequency bands in a range from 5030 to 5990 megahertz, or one or more frequency bands in a range from 5925 to 7125 megahertz.

4. The method according to claim 3, wherein at least one of the one or more first transmission power levels respectively corresponding to the one or more of the first non-CBRS frequency bands is less than each of the one or more first transmission power levels respectively corresponding to the one or more of the first CBRS frequency bands.

5. The method according to claim 1, wherein the transmitting the first data includes transmitting the first data to a second access point device.

6. The method according to claim 1, wherein the transmitting the first data includes transmitting the first data to a client device.

7. The method according to claim 1, further comprising:
obtaining, by the channel allocation device, second channel requirement information indicating a second bandwidth of the channel;
obtaining, by the channel allocation device, available channel information indicating a plurality of second CBRS frequency bands and a plurality of second non-CBRS frequency bands available to be allocated to the channel;
selecting, by the channel allocation device, one or more of the second CBRS frequency bands and one or more of the second non-CBRS frequency bands based on the second channel requirement information;

generating, by the channel allocation device, second channel aggregation information indicating the one or more of the second CBRS frequency bands and the one or more of the second non-CBRS frequency bands selected based on the second channel requirement information;

generating, by the channel allocation device, second transmission power level information indicating one or more second transmission power levels respectively corresponding to the one or more of the second CBRS frequency bands and one or more second transmission power levels respectively corresponding to the one or more of the second non-CBRS frequency bands;

transmitting, by the channel allocation device, to the external device, the second channel aggregation information and the second transmission power level information;

receiving, by the first access point device, the second channel aggregation information and the second transmission power level information; and transmitting, by the first access point device, second data in the channel using the one or more of the second CBRS frequency bands and the one or more of the second non-CBRS frequency bands based on the second transmission power level information.

8. The method according to claim 7, wherein the one or more of the first CBRS frequency bands are same as the one or more of the second CBRS frequency bands, the one or more of the first non-CBRS frequency bands are different from the one or more of the second non-CBRS frequency bands.

9. A system, comprising:
a channel allocation device configured to:
obtain first channel requirement information indicating a first bandwidth of a channel;
obtain available channel information indicating a plurality of first Citizens Broadband Radio Service (CBRS) frequency bands and a plurality of first non-CBRS frequency bands available to be allocated to the channel;
select one or more of the first CBRS frequency bands and one or more of the first non-CBRS frequency bands based on the first channel requirement information;
generate first channel aggregation information indicating the one or more of the first CBRS frequency bands and the one or more of the first non-CBRS frequency bands selected based on the first channel requirement information;
generate first transmission power level information indicating one or more first transmission power levels respectively corresponding to the one or more of the first CBRS frequency bands and one or more first transmission power levels respectively corresponding to the one or more of the first non-CBRS frequency bands; and
transmit, to an external device, the first channel aggregation information and the first transmission power level information; and
a first access point device configured to:
receive the first channel aggregation information and the first transmission power level information; and
transmit first data in the channel using the one or more of the first CBRS frequency bands and the one or more of the first non-CBRS frequency bands based on the first transmission power level information.

10. The system according to claim 9, wherein the one or more of the first CBRS frequency bands include one or more frequency bands in a range from 3550 to 3700 megahertz, and the one or more of the first non-CBRS frequency bands include one or more frequency bands in a range from 3300 to 4200 megahertz.

11. The system according to claim 9, wherein the one or more of the first CBRS frequency bands include one or more frequency bands in a range from 3550 to 3700 megahertz, and the one or more of the first non-CBRS frequency bands include one or more frequency bands in a range from 2401 to 2495 megahertz, one or more frequency bands in a range from 5030 to 5990 megahertz, or one or more frequency bands in a range from 5925 to 7125 megahertz.

12. The system according to claim 9, wherein the first access point device transmits the first data by being configured to:
transmit the first data to a second access point device.

13. The system according to claim 9, wherein the first access point device transmits the first data by being configured to:
transmit the first data to a client device.

14. The system according to claim 9, wherein the channel allocation device is further configured to:
obtain second channel requirement information indicating a second bandwidth of the channel;
obtain available channel information indicating a plurality of second CBRS frequency bands and a plurality of second non-CBRS frequency bands available to be allocated to the channel;
select one or more of the second CBRS frequency bands and one or more of the second non-CBRS frequency bands based on the second channel requirement information;
generate second channel aggregation information indicating the one or more of the second CBRS frequency bands and the one or more of the second non-CBRS frequency bands selected based on the second channel requirement information;
generate second transmission power level information indicating one or more second transmission power levels respectively corresponding to the one or more of the second CBRS frequency bands and one or more second transmission power levels respectively corresponding to the one or more of the second non-CBRS frequency bands; and
transmit, to the external device, the second channel aggregation information and the second transmission power level information;
and wherein the first access point device is further configured to:
receive the second channel aggregation information and the second transmission power level information; and
transmit second data in the channel using the one or more of the second CBRS frequency bands and the one or more of the second non-CBRS frequency bands based on the second transmission power level information.

15. The system according to claim 14, wherein the one or more of the first CBRS frequency bands are same as the one or more of the second CBRS frequency bands, the one or more of the first non-CBRS frequency bands are different from the one or more of the second non-CBRS frequency bands.

16. A non-transitory computer-readable storage medium having computer executable instructions stored thereon that, when executed by at least one processor, cause the at least one processor to perform actions, the actions comprising:
- obtaining first channel requirement information indicating a first bandwidth of a channel;
- obtaining available channel information indicating a plurality of first Citizens Broadband Radio Service (CBRS) frequency bands and a plurality of first non-CBRS frequency bands available to be allocated to the channel;
- selecting one or more of the first CBRS frequency bands and one or more of the first non-CBRS frequency bands based on the first channel requirement information;
- generating first channel aggregation information indicating the one or more of the first CBRS frequency bands and the one or more of the first non-CBRS frequency bands selected based on the first channel requirement information;
- generating first transmission power level information indicating one or more first transmission power levels respectively corresponding to the one or more of the first CBRS frequency bands and one or more first transmission power levels respectively corresponding to the one or more of the first non-CBRS frequency bands; and
- transmitting to an external device, the first channel aggregation information and the first transmission power level information.

17. The non-transitory computer-readable storage medium according to claim 16, wherein the one or more of the first CBRS frequency bands include one or more frequency bands in a range from 3550 to 3700 megahertz, and the one or more of the first non-CBRS frequency bands include one or more frequency bands in a range from 3300 to 4200 megahertz.

18. The non-transitory computer-readable storage medium according to claim 16, wherein the one or more of the first CBRS frequency bands include one or more frequency bands in a range from 3550 to 3700 megahertz, and the one or more of the first non-CBRS frequency bands include one or more frequency bands in a range from 2401 to 2495 megahertz, one or more frequency bands in a range from 5030 to 5990 megahertz, or one or more frequency bands in a range from 5925 to 7125 megahertz.

19. The non-transitory computer-readable storage medium according to claim 18, wherein at least one of the one or more first transmission power levels respectively corresponding to the one or more of the first non-CBRS frequency bands is less than each of the one or more first transmission power levels respectively corresponding to the one or more of the first CBRS frequency bands.

20. The non-transitory computer-readable storage medium according to claim 16, wherein the computer executable instructions, when executed by the at least one processor, cause the at least one processor to perform further actions, the further actions comprising:
- obtaining second channel requirement information indicating a second bandwidth of the channel;
- obtaining available channel information indicating a plurality of second CBRS frequency bands and a plurality of second non-CBRS frequency bands available to be allocated to the channel;
- selecting one or more of the second CBRS frequency bands and one or more of the second non-CBRS frequency bands based on the second channel requirement information;
- generating second channel aggregation information indicating the one or more of the second CBRS frequency bands and the one or more of the second non-CBRS frequency bands selected based on the second channel requirement information;
- generating second transmission power level information indicating one or more second transmission power levels respectively corresponding to the one or more of the second CBRS frequency bands and one or more second transmission power levels respectively corresponding to the one or more of the second non-CBRS frequency bands; and
- transmitting, to the external device, the second channel aggregation information and the second transmission power level information.

* * * * *